(12) United States Patent
Xu et al.

(10) Patent No.: US 11,320,405 B2
(45) Date of Patent: May 3, 2022

(54) NON-DESTRUCTIVE DETECTING METHOD FOR WELD RESIDUAL STRESS AND A PROBE USING THE SAME

(71) Applicant: BEIJING INSTITUTE OF TECHNOLOGY, Beijing (CN)

(72) Inventors: Chunguang Xu, Beijing (CN); Yuren Lu, Beijing (CN); Dezhi Li, Beijing (CN); Peng Yin, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 189 days.

(21) Appl. No.: 16/684,900

(22) Filed: Nov. 15, 2019

(65) Prior Publication Data

US 2020/0158585 A1 May 21, 2020

(30) Foreign Application Priority Data

Nov. 16, 2018 (CN) .......................... 201811366766.6

(51) Int. Cl.
*G01N 29/24* (2006.01)
*G01N 29/22* (2006.01)
*G01L 5/00* (2006.01)

(52) U.S. Cl.
CPC ........ *G01N 29/2487* (2013.01); *G01L 5/0047* (2013.01); *G01N 29/221* (2013.01); *G01N 2291/0234* (2013.01); *G01N 2291/102* (2013.01); *G01N 2291/267* (2013.01)

(58) Field of Classification Search
CPC ............. G01N 29/2487; G01N 29/221; G01N 2291/0234; G01N 2291/102; G01N 2291/267; G01L 5/0047

USPC .......................................................... 73/602
See application file for complete search history.

(56) References Cited

U.S. PATENT DOCUMENTS

| 4,926,692 | A | * | 5/1990 | Brokowski | ............ | G01N 29/07 73/597 |
| 2008/0047347 | A1 | * | 2/2008 | Sato | ...................... | G01N 29/043 73/597 |
| 2015/0300897 | A1 | * | 10/2015 | Xu | ....................... | G01N 29/041 73/597 |

(Continued)

FOREIGN PATENT DOCUMENTS

| CN | 105424243 A |   | 3/2016 |
| CN | 106813819 A | * | 6/2017 |

*Primary Examiner* — Lisa M Caputo
*Assistant Examiner* — Rose M Miller
(74) *Attorney, Agent, or Firm* — John A. Miller; Shumaker, Loop & Kendrick, LLP

(57) ABSTRACT

The present disclosure provides a non-destructive detecting method for weld residual stress and a probe using the same, in the above method, detecting is performed by an ultrasonic detecting probe in contact with a detected portion of a workpiece to be detected, wherein when the weld residual stress of an intersecting curve weld bead of surfaces of cylinders is detected, for the same position of the intersecting curve weld bead, one of the residual stress of an axial direction of the cylinders and the residual stress of a circumferential direction of the cylinders is detected as a principal stress. For the surface of the cylinder at one side of the intersecting curve weld bead, the detecting of the weld residual stress of the surface of the cylinder can be realized only by using an ultrasonic detecting probe having one type of curved surface.

5 Claims, 3 Drawing Sheets

(a)   (b)

(56) References Cited

U.S. PATENT DOCUMENTS

2021/0025769 A1* 1/2021 Xu ........................ B81B 3/0072

* cited by examiner (a)          (b)

(a)          (b)

NON-DESTRUCTIVE DETECTING METHOD FOR WELD RESIDUAL STRESS AND A PROBE USING THE SAME

CROSS-REFERENCE TO RELATED APPLICATION

This application claims priority to Chinese Patent Application No. 201811366766.6, filed on Nov. 16, 2018 and titled "Non-destructive detecting method for weld residual stress and a probe using the same", which is incorporated herein by reference in its entirety.

TECHNICAL FIELD

The present disclosure relates to a non-destructive detecting method for weld residual stress and a probe using the same.

BACKGROUND

Welding of steel structures has always been an important process in industrial engineering, and it has been widely used in various industries. Due to the requirements of various engineering techniques, the complexity of the welding of the steel structures is greatly increased. At the same time, distribution of residual stress at a weld bead of the steel structures becomes more and more complicated. The existence of the residual stress at the weld bead will directly lead to cracks in the steel structures, induce corrosion and other phenomena after a long period of time. Non-destructive detecting of the residual stress has been widely concerned. Ultrasonic method is one of the main detecting methods. The theory of the ultrasonic method has been mature, and the residual stress may be detected for various weld beads of the steel structures. Due to different distributions of the residual stress at the weld bead of the steel structures, it is necessary to design different detecting positions and detecting directions for the various distributions of the residual stress.

Literature search found that there is no clear and feasible method for the non-destructive detecting of a distribution state of the weld residual stress of the steel structures. Most of the detecting methods for weld residual stress only use an ultrasonic detecting probe to detect the residual stress of an annular weld bead or a straight weld bead by contacting the welded steel structures and transmitting and receiving ultrasonic waves. When detecting the residual stress of the annular weld bead, an ultrasonic detecting probe is disposed in normal and tangential directions of the annular weld bead. The above methods are mostly used for detecting of the residual stress in a flat weld bead.

For the more complicated weld structure such as the welding of a cylindrical pipe, if the above methods are adopted, in order to enable the ultrasonic detecting probe to contact the workpiece to be detected at the detecting portion, it is necessary to design contact surfaces of a plurality of ultrasonic detecting probes with different curvatures for different positions. This leads to higher costs, low utilization of the ultrasonic detecting probes, and cumbersome detecting.

SUMMARY

The present disclosure has been made in view of the above circumstances, and an object thereof is to enable non-destructive detecting of a relatively complicated weld bead structure such as welding of a cylindrical pipe by one or a few kinds of ultrasonic detecting probes.

In order to achieve the above object, the present disclosure provides a non-destructive detecting method for weld residual stress, which performs detecting by using an ultrasonic detecting probe in contact with a detected portion of a workpiece to be detected, wherein when the weld residual stress of an intersecting curve weld bead of surfaces of cylinders is detected, for the same position of the intersecting curve weld bead, detecting one of the residual stress of an axial direction of the cylinders and the residual stress of a circumferential direction of the cylinders as a principal stress.

The above structure utilizes the structural features of the cylindrical pipe during welding, that is, the cylindrical pipe has a regular curved surface, and the curvature radius is the same at different positions in the axial or circumferential direction. Thus, according to the above method, for the surface of the cylinder at one side of the intersecting curve weld bead, the detecting of the weld residual stress of the surface of the cylinder can be realized only by using an ultrasonic detecting probe having one kind of curved surface.

The above-described objects, features and advantages will be more readily understood from the following description of the embodiments illustrated in the drawings.

DETAILED DESCRIPTION

Specific embodiments of the present disclosure are described in detail below.

Figure 1:
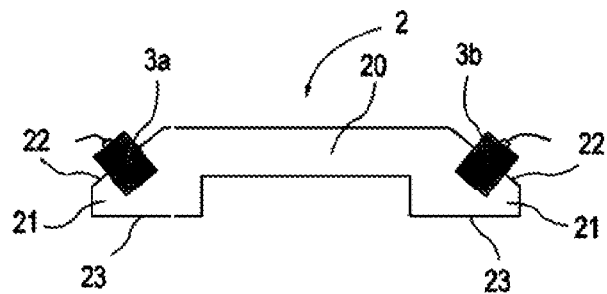
FIG. 1 is a schematic view showing the structure of an ultrasonic detecting probe.

As shown in FIG. 1, an ultrasonic detecting probe 1 may include an ultrasonic wedge 2 and two ultrasonic transducers 3 mounted at both ends of the ultrasonic wedge, and the two ultrasonic transducers 3 are a transmitting transducer 3a and a receiving transducer 3b respectively. The transmitting transducer 3a may be used for transmitting ultrasonic waves, and the receiving transducer 3b may be used for receiving the ultrasonic waves transmitted by the transmitting transducer 3a.

The ultrasonic wedge 2 has an elongated shape and a dumbbell-shaped symmetrical structure, and may include two base portions 21 and a connecting portion 20 connecting the two base portions 21. The base portions 21 each have a block structure with a contact surface 23 for contacting a workpiece W to be detected. The contact surface 23 has a curvature that fits the workpiece W to be detected. A material of the ultrasonic wedge 2 may be selected in such a way that a velocity at which the ultrasonic waves propagate in the ultrasonic wedge 2 is slower than a velocity at which the ultrasonic waves propagate in the workpiece W to be detected.

A chamfered portion 22 that is inclined with respect to the contact surface 23 is formed on a side away from the contact surface 23 and away from the connecting portion 20. Both the transmitting transducer 3a and the receiving transducer 3b are disposed on the chamfered portion 22 in a manner perpendicular to the chamfered portion 22. The ultrasonic waves transmitted by the transmitting transducer 3a are transmitted to a surface of the contact surface 23 in contact with the workpiece W. When an ultrasonic longitudinal wave is incident at a first critical angle, a critical refracting longitudinal wave is excited on a surface of the workpiece, and is received by the receiving transducer 3b through a surface of the other side contact surface 23 in contact with the workpiece W.

Figure 2:
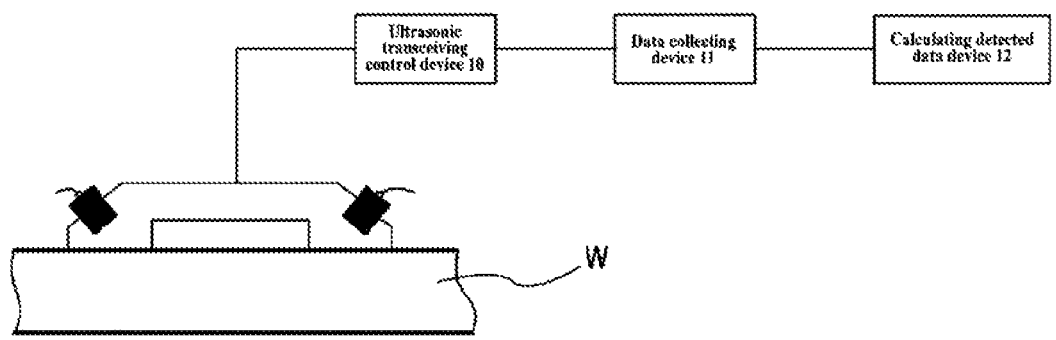
FIG. 2 is a schematic view illustrating the principle of a stress ultrasonic detecting system.

As shown in FIG. 2, in a ultrasonic detecting system, the ultrasonic detecting probe 1 is controlled by a ultrasonic transceiving control device 10, and data received from the ultrasonic detecting probe 1 is collected by a data collecting device 11, and then the collected data is calculated by a calculating detected data device 12 to obtain stress of a detected portion of the workpiece W to be detected. Different ultrasonic transceiving control devices 10 and data collecting devices 11 may be selected according to different detecting requirements. The specific detecting principle and process will be described in detail thereafter.

Next, a description will be made with reference to FIGS. 3 to 7, a method of detecting weld residual stress of an intersecting curve weld bead of a cylindrical surface by the ultrasonic detecting probe 1 and a structure of the corresponding ultrasonic detecting probe 1.

Figure 3:
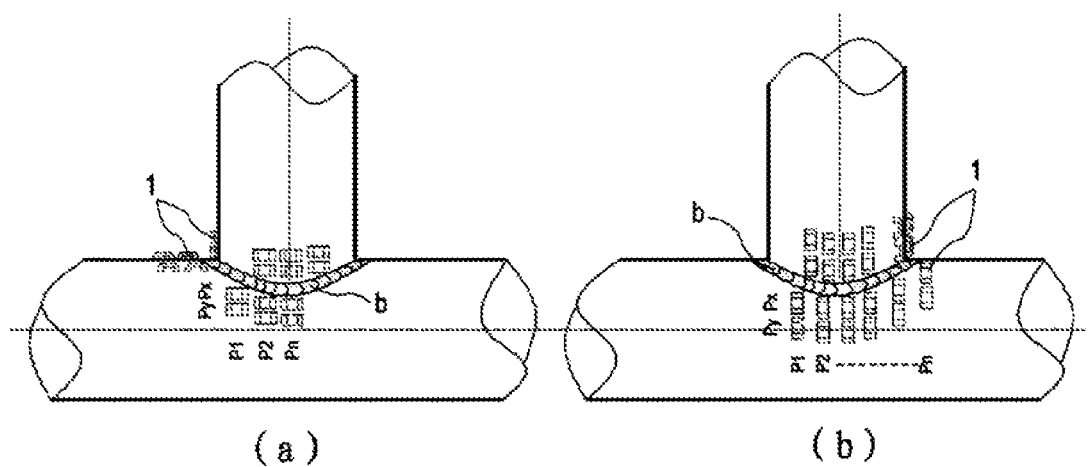
FIG. 3 is a schematic view showing a detecting direction and position of a weld residual stress region of an intersecting curve of a cylindrical pipe T-shaped joint, wherein (a) and (b) show cases where the ultrasonic detecting probe is placed in different directions.

In FIG. 3, two cylindrical pipes are welded in a T-shape. When detecting the residual stress region of the intersecting curve of the cylindrical pipe T-shaped joint, for detecting of a lower side region (pipe A) of the weld bead b, as shown in (a) of FIG. 3, the ultrasonic detecting probe 1 is placed in the axial direction of the pipe A, and along the direction of the weld bead b, a plurality of points P1, P2, . . . Pn are sequentially detected to obtain a residual stress value of each point. When the ultrasonic detecting probe 1 is placed, for each position to be detected along the course of the weld bead b, the residual stress values are preferably detected at two points $P_x$, $P_y$ (which are adjacent in the circumferential direction of the pipe A) close to the weld bead b and away from the weld bead b, to accurately grasp a change in the stress of the pipe A caused by the welding. Of course, it is also possible to select only one point or select more than three points.

Alternatively, as also shown in (b) of FIG. 3, the ultrasonic detecting probe 1 may be placed in the circumferential direction of the pipe A, and the plurality of points P1, P2, . . . Pn are sequentially detected along the direction of the weld bead b, to obtain a residual stress value at each point. Similarly, when the ultrasonic detecting probe 1 is placed, the residual stress values are detected at different positions of the weld bead b, preferably at two points $P_x$, $P_y$ (which are adjacent in the circumferential direction of the pipe A) close to the weld bead b and away from the weld bead b to accurately grasp a change in the stress of the pipe A caused by the welding.

A distance between the different positions of the ultrasonic detecting probe 1 shown in FIG. 3 is larger than the length and the width of the ultrasonic detecting probe 1, but it is only for convenience of illustration in FIG. 3, and is not intended to define the distance. In order to more accurately obtain the stress state on both sides of the weld bead b, regarding the distance between the different positions of the ultrasonic detecting probe 1 at the time of detecting, when the ultrasonic detecting probe 1 is placed along its own length direction, preferably the distance between the different positions to be detected is smaller than the length of the ultrasonic detecting probe 1; and when the ultrasonic detecting probe 1 is placed along its own width direction, preferably the distance between the different positions to be detected is smaller than the width of the ultrasonic detecting probe 1.

Preferably, the above two types of detectings are performed on the above points, that is, detectings along the axial and circumferential directions of the pipe, and vector calculation is performed on the two types of detecting results to obtain a principal stress.

For detecting of an upper side region (pipe B) of the weld bead b in the figure, as shown in (a) of FIG. 3, the ultrasonic detecting probe 1 may be placed in the circumferential direction of the pipe B, and a plurality of points are sequentially detected along the direction of the weld bead b to obtain a residual stress value of each point. Alternatively, as shown in (b) of FIG. 3, the ultrasonic detecting probe 1 may also be placed along the axial direction of the pipe A, and a plurality of points may be sequentially detected along the direction of the weld bead b to obtain a residual stress value of each point. Preferably, the above two types of detectings are performed on the above points, and vector calculation is performed on the two types of detecting results to obtain a principal stress.

For the detecting of the upper and lower side regions of the weld bead b, FIG. 3 shows the case where the ultrasonic detecting probe 1 is placed in the axial direction of the pipe A and the circumferential direction of the pipe B respectively for detecting, and the case where the ultrasonic detecting probe 1 is placed in the circumferential direction of the pipe A and the axial direction of the pipe B respectively for detecting. This is merely an example for understanding the present disclosure, and the present disclosure is not limited thereto. For example, it is also a combination where the ultrasonic detecting probe 1 is placed in the axial direction of the pipe A and in the axial direction of the pipe B, and a combination where the ultrasonic detecting probe 1 is placed in the circumferential direction of the pipe A and in the circumferential direction of the pipe B. Which pipe is first detected, whether detecting is performed first in the circumferential direction or in the axial direction, and whether $P_x$ or $P_y$ is detected first, can be arbitrarily selected, and are not particularly limited. In addition, in FIG. 3, only a few points are schematically selected to indicate the placement positions of the ultrasonic detecting probe 1, and the positions shown in the figure are not used to define the placement positions of the ultrasonic detecting probe 1. The ultrasonic detecting probe 1 may be placed at any positions on both sides of the weld bead b where it is necessary to detect the residual stress value. The embodiments shown in the following FIGS. 4 to 7 are the same as the above, which will not be described again.

In FIG. 3, when detecting is performed on the pipe A region side of the weld bead b in the weld residual stress region of the intersecting curve of the cylindrical pipe T-shaped joint, in the case where the ultrasonic detecting probe 1 is placed in the axial direction of the pipe A, the curvatures of the respective detected positions of the workpiece W are the same regardless of which position of the surface of the pipe A the ultrasonic detecting probe 1 is placed at, and this may avoid the problem that the curvatures of the contact faces 23 at different positions are different when being placed along the intersecting curve. That is, only one ultrasonic detecting probe 1 is required. Similarly, in the case where the ultrasonic detecting probe 1 is placed in the circumferential direction of the pipe A, the curvatures of the respective detected positions of the workpiece W are also the same regardless of which position of the surface of the pipe A the ultrasonic detecting probe 1 is placed at, and only one ultrasonic detecting probe 1 is required.

In the case where the above two types of detectings are performed on the above points and vector calculation is performed on the two types of detecting results to obtain the principal stress, it is only necessary to prepare the contact faces 23 of the two types of curvatures. The manufacturing cost of the ultrasonic detecting probe 1 is reduced, and the detecting process is also simplified.

When the detecting is performed on the pipe B region side of the weld bead b in the weld residual stress region of the intersecting-curve of the cylindrical pipe T-shaped joint, it is the same as the detecting on the pipe A region side, and the description thereof is omitted herein.

In addition, in the case where pipe diameters of the pipe A and the pipe B are the same, the advantages of the present disclosure are more remarkable, and the manufacturing cost of the ultrasonic detecting probe 1 can be further saved, and the detecting process can be further simplified.

Figure 4:
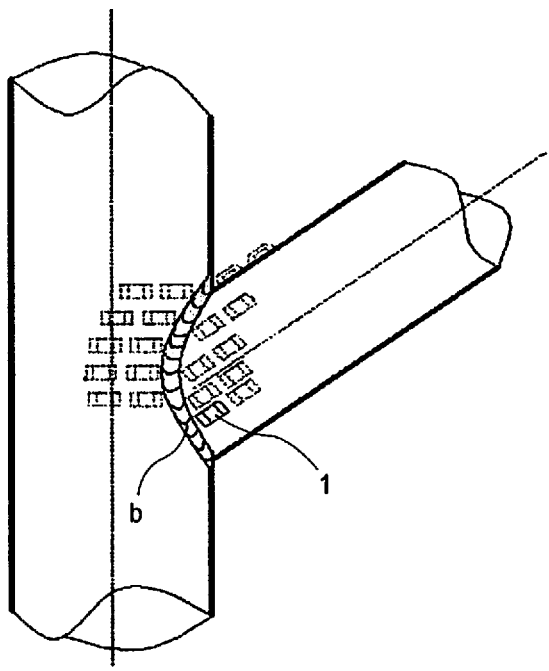
FIG. 4 is a schematic view showing a detecting direction and position of a weld residual stress region of an intersecting curve of a cylindrical pipe Y-shaped joint, wherein (a) and (b) show cases where the ultrasonic detecting probe is placed in different directions.
Figure 4:
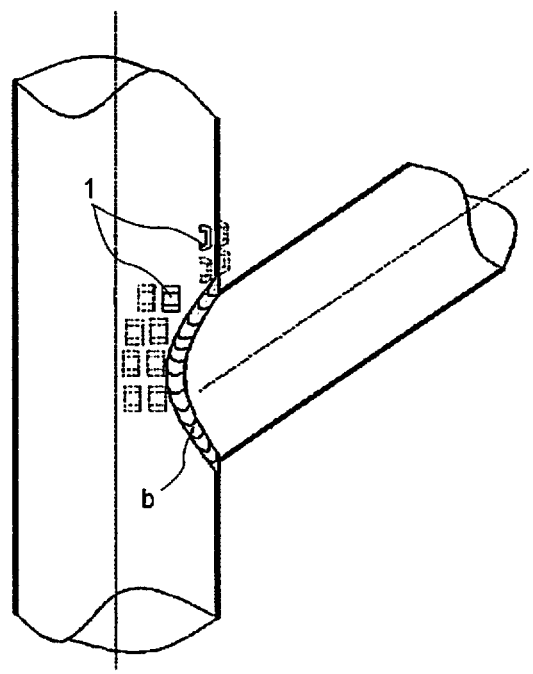
Figure 5:
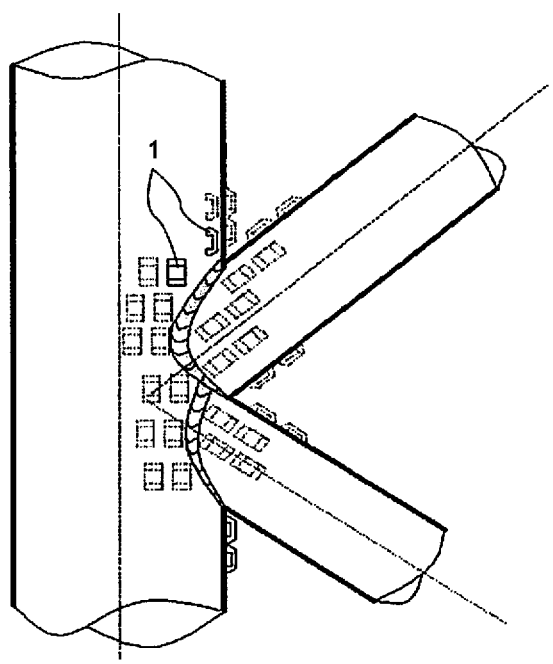
FIG. 5 is a schematic view showing a detecting direction and position of a weld residual stress region of an intersecting curve of a cylindrical pipe K-shaped joint, wherein (a) and (b) show cases where the ultrasonic detecting probe is placed in different directions.
Figure 5:
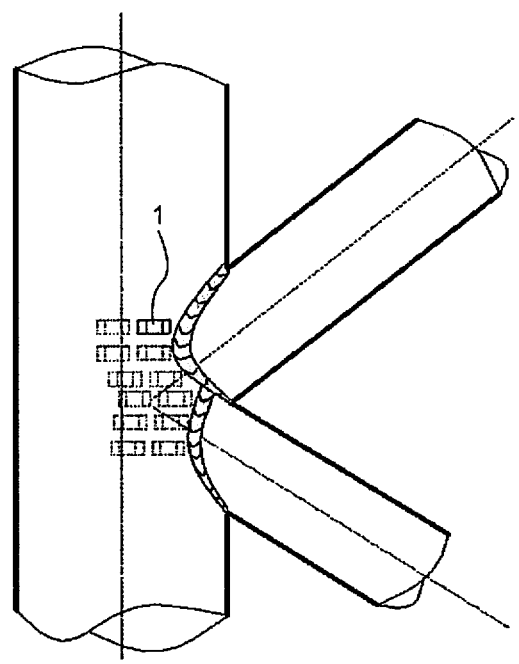
Figure 6:
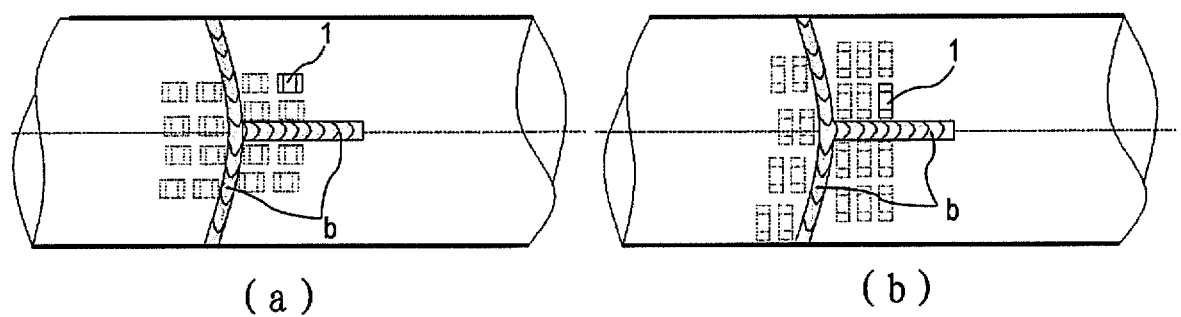
FIG. 6 is a schematic view showing a detecting direction and position of a weld residual stress region of a cylindrical pipe T-shaped crossing weld bead, wherein (a) and (b) show cases where the ultrasonic detecting probe is placed in different directions.
Figure 7:
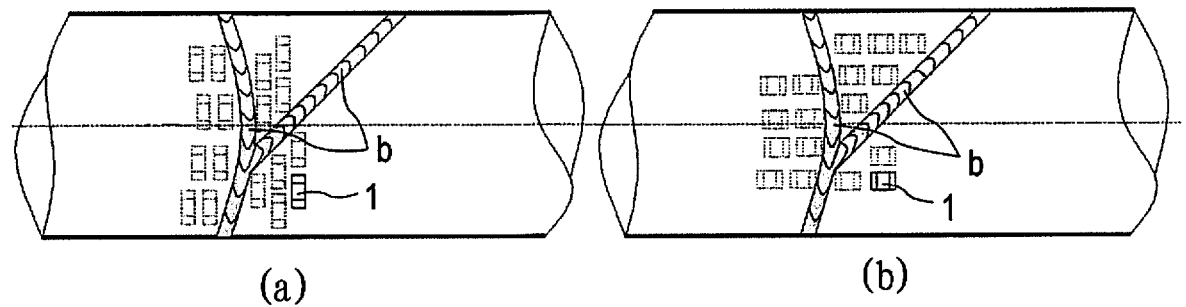
FIG. 7 is a schematic view showing a detecting direction and position of a weld residual stress region of a cylindrical pipe acute-angled crossing weld bead, wherein (a) and (b) show cases where the ultrasonic detecting probe is placed in different directions.

FIG. 4 shows detecting of the weld residual stress region of the intersecting curve of the cylindrical pipe Y-shaped joint by the ultrasonic detecting probe 1. FIG. 5 shows detecting of the weld residual stress region of the intersecting curve of the cylindrical pipe K-shaped joint by the ultrasonic detecting probe 1, FIG. 6 shows detecting of the weld residual stress region of the cylindrical pipe T-shaped crossing weld bead by the ultrasonic detecting probe 1, and FIG. 7 shows detecting of the weld residual stress region of the cylindrical pipe acute-angled weld bead by the ultrasonic detecting probe 1.

It can be seen from the above embodiments that, in either case, as long as the ultrasonic detecting probe 1 is placed in the respective axial directions or circumferential directions of the pipes on both sides of the intersecting curve weld bead b, the stress values of the plurality of points are calculated and the stress distribution state can be obtained. Alternatively, for the plurality of points on the workpiece W to be detected, the ultrasonic detecting probe 1 is placed in both the axial direction and the circumferential direction of the pipes, then vector summation is performed to obtain the principal stress, and the stress distribution state is obtained by obtaining the principal stress of the plurality of points. The principal stress obtained by the vector summation can more accurately reflect the stress at each point.

Zero stress calibration may be performed before the weld residual stress is detected, and the zero stress waveform is recorded. This can more intuitively reflect the stress distribution state.

Next, the principle and specific process for performing detecting by the ultrasonic detecting probe 1 will be described.

1. Generation of $L_{CR}$ Waves

It can be known from Snell's law that refraction occurs when the ultrasonic longitudinal wave propagates from the wedge with a slower wave velocity to a steel structure with a faster wave velocity. When the longitudinal wave refraction angle is equal to 90°, the corresponding incident angle is called a first critical angle, and the calculation formula is as follows.

$$\theta_{cr} = \sin^{-1}(V_0/V_1)$$

In the formula:

$V_1$—ultrasonic longitudinal wave propagation velocity (m/s) in a medium with the slower wave velocity;

$V_2$—ultrasonic longitudinal wave propagation velocity (m/s) in a medium with the faster wave velocity.

θ cr—the first critical refraction angle (°);

The first critical angle of the detecting point is calculated according to the shape of different steel structures (flat plate, cylinder), different welding processes, and the like.

2. Principle for Detecting Stress by Ultrasonic Waves

According to the basic principle of acoustoelasticity, when the ultrasonic waves propagate in an isotropic elastic medium, the amount of change in ultrasonic wave velocity is linear with the amount of change in residual stress when the polarization direction of the undulating particle is consistent with or opposite to the direction of the residual stress (i.e., 0 or 180 degrees). Therefore, the residual stress in this direction can be detected using the ultrasonic critical refracting longitudinal wave. When the velocity of the critical refracting longitudinal wave increases, it indicates that there is compressive residual stress in the material. Conversely, there is tensile residual stress. Under the condition that the property of the material is determined, the relationship between the amount dV of change in the propagation velocity of the critical refracting longitudinal wave and the amount da of change in the residual stress is as follows:

$$d\sigma = \frac{2}{kV_0} \cdot dV$$

In the formula:

Dσ—the amount of change in the residual stress (MPa);

dV—the amount of change in the propagation velocity of the critical refracting longitudinal wave (m/s);

V0—the propagation velocity of the critical refracting longitudinal wave (m/s) under zero stress conditions;

k—acoustoelasticity coefficient (ns/m2);

When a propagation distance L of the critical refracting longitudinal wave is determined, the change in the sound velocity in the detected medium may be replaced by the sound time change equivalent, and the formula is as follows:

$$dt = -\frac{kt_0}{2} \cdot d\sigma$$

In the formula:

dt is the amount of change in a propagation sound time of the critical refracting longitudinal wave;

$t_0$ is the time (s) required for the critical refracting longitudinal wave to propagate a fixed distance under zero stress conditions;

the stress constant is set $K=2/kt_0$, where $t_0$ is a time required for the critical refracting longitudinal wave to propagate a fixed distance under zero stress conditions, and the stress change is approximately linear with the change in the propagation sound time of the ultrasonic wave, i.e. $\Delta\sigma=K\Delta t$.

3. Calculation of the Stress Constant K

The same tensile and compression specimens as the gear material were produced, and calibration was performed on the value K using an electronic tensile tester, an ultrasonic pulse transceiver, and an oscilloscope. Specific steps are as follows:

Within the yield limit of the gear material, the tensile tester is used to pull and compress the tensile test piece, and a time difference ti displayed in the oscilloscope and a stress value σi displayed by the tensile tester are recorded at intervals of a certain stress value (this method uses every 50 MPa). The curve fitting is performed by the least squares method, and the stress constant K is calculated.

$$\sum_{i=0}^{i=n} [\sigma_i - k \times (t_i - t_0)^2]^2 = \sigma_{min}$$

4. Detecting of the Weld Residual Stress in the Steel Structure

Firstly, a sound path distance between the two wedges is detected, which is recorded as S. Then the propagation time of the ultrasonic longitudinal wave between the two wedges under zero stress state is t0=S/Vgear, the sound velocity of the ultrasonic longitudinal wave in the welded steel structure under the stress state is Vi, and the stress of the steel structure is as follows:

$$\sigma = k \times \left( \frac{S}{V_i} - \frac{S}{V_{welded\_steel}} \right)$$

The above is only the preferred embodiments of the present disclosure, and is not intended to limit the present disclosure. Any modifications, equivalent substitutions, improvements, etc., which are included in the spirit and scope of the present disclosure, all should be included in the scope of protection of the present disclosure.

The present disclosure is not limited to the welding of the cylindrical pipes, and the present disclosure can be used to test the residual stress on the cylindrical pipe side as long as the cylindrical pipe is present.

In addition, the present disclosure has been described by taking the testing of the weld residual stress region of the intersecting curve of the cylindrical pipe as an example, but the present disclosure is not limited to the cylindrical pipe, and as long as there has a certain curvature in a certain direction, the present disclosure can be applied in this direction.

What is claimed is:

1. A method for non-destructive detecting of weld residual stress on a workpiece, said workpiece including cylindrical pipes welded together by an intersecting curve weld bead at an intersection of the cylindrical pipes, said method comprising:

detecting the weld residual stress along an axial direction and a circumferential direction of the cylindrical pipes at the intersecting curve weld bead using an ultrasonic detecting probe placed in the axial direction and the circumferential direction; and performing vector summation of the detected residual stress along the axial direction and the detected residual stress along the circumferential direction to obtain a principal stress.

2. The method according to claim 1, further comprising:

detecting the weld residual stress along the axial direction and the circumferential direction at a plurality of positions along the intersecting curve, and obtaining, after the principal stress is calculated for each of the plurality of positions, a stress distribution state of the intersecting curve weld bead based on a plurality of the calculated principal stresses.

3. The method according to claim 2, further comprising:

performing a zero stress calibration and recording a zero stress waveform before the weld residual stress is detected.

4. The method according to claim 1, wherein:

the ultrasonic detecting probe includes an ultrasonic wedge, and a transmitting transducer and a receiving transducer respectively mounted at both ends of the ultrasonic wedge, said ultrasonic wedge having a contact portion for contacting the workpiece, wherein a surface of the contact portion has a curvature that fits the workpiece.

5. The method according to claim 4, wherein:

a velocity at which ultrasonic waves propagate in the ultrasonic wedge is slower than a velocity at which ultrasonic waves propagate in the workpiece.

* * * * *